United States Patent [19]
Mayer

[11] 3,941,012
[45] Mar. 2, 1976

[54] DUAL DRIVE MECHANISM

[75] Inventor: Donald K. Mayer, Bloomington, Minn.

[73] Assignee: Westinghouse Electric Corporation, Pittsburgh, Pa.

[22] Filed: May 7, 1975

[21] Appl. No.: 575,289

Related U.S. Application Data

[63] Continuation of Ser. No. 441,685, Feb. 11, 1974, abandoned.

[52] U.S. Cl. ............... 74/661; 60/716; 60/718; 62/236; 192/103 B
[51] Int. Cl.² ............... F16H 37/06; F25B 27/00; F16D 43/06; F02B 73/00
[58] Field of Search .......... 74/661; 62/236; 60/39.3, 60/716, 718; 192/105 B, 105 BB, 103 B

[56] References Cited
UNITED STATES PATENTS

| | | | |
|---|---|---|---|
| 2,203,406 | 12/1932 | Dempsey, Jr. | 62/236 |
| 2,667,761 | 2/1954 | Sellstrom | 62/236 |
| 2,669,098 | 2/1954 | Buell | 60/716 X |
| 3,367,465 | 2/1968 | Newman | 192/105 BA |
| 3,404,529 | 10/1968 | Lagerstrom | 60/718 X |
| 3,461,746 | 9/1967 | Schwerdhofer | 192/103 B X |
| 3,543,518 | 12/1970 | Shibata | 60/718 X |
| 3,744,180 | 7/1973 | Mabuchi | 192/105 BB X |

FOREIGN PATENTS OR APPLICATIONS

| | | | |
|---|---|---|---|
| 553,740 | 3/1958 | Canada | 60/716 |
| 593,791 | 3/1934 | Germany | 60/716 |
| 457,674 | 3/1928 | Germany | 60/716 |

Primary Examiner—Samuel Scott
Assistant Examiner—Parshotam S. Lall
Attorney, Agent, or Firm—F. E. Blake

[57] ABSTRACT

An electric motor and an in-line speed-responsive clutch are arranged so as to provide dual drive for selectively driving a refrigerant compressor by either an internal combustion engine or by the electric motor. The rotor of the electric motor is journalled for relative rotation on the output shaft of the engine, and the motor rotor can be driven through the clutch when the output speed of the engine output shaft exceeds a predetermined minimum. By having both power sources adapted to drive the compressor with the motor rotor journalled on the engine output shaft and by employing a single clutch, economy of parts, relative ease in assembly, and a more compact arrangement may be achieved.

5 Claims, 3 Drawing Figures

DUAL DRIVE MECHANISM

CROSS REFERENCES TO RELATED APPLICATIONS

This is a continuation of application Ser. No. 441,685 filed Feb. 11, 1974, now abandoned.

BACKGROUND OF THE INVENTION AND PRIOR ART

A conventional method for providing either engine drive or electric motor drive for a refrigerant compressor, such as that which might be used with a self-contained transportable refrigeration unit to preserve a perishable cargo during transit, includes a prime mover, such as an internal combustion engine driving the compressor through a centrifugal clutch, or the compressor may be alternately belt driven by an electric motor.

One example of such a dual drive mechanism to be employed as part of a transportable refrigeration unit, where an internal combustion engine, an electric motor, a refrigerant compressor, and a clutch are all disposed in an in-line arrangement, is to be found in the patent to L. T. Sellstrom, U.S. Pat. No. 2,667,761, issued February, 1954. With the foregoing arrangement, each of the engine, the motor, and the compressor is provided with a respective shaft, with the engine shaft and the motor shaft being connected by a drive coupling and the motor shaft and the compressor shaft also being connected by a drive coupling. In addition to the plurality of drive shafts and drive couplings, the necessity of the number of bearings that would be required for this type arrangement can prove to be both uneconomical in terms of manufacture and compactness.

Another example of a prime mover-electric motor dual drive mechanism can be found in the patent to G. Lagerstrom, U.S. Pat. No. 3,404,529, issued October, 1968, wherein both power sources may drive a common drive shaft, and bearing means are provided whereby the rotor of the electric motor may rotate on the common drive shaft. However, by the nature of the foregoing arrangement, a dual clutch and bearing arrangement is required which consequently may also become uneconomical in terms of manufacture and compactness.

SUMMARY OF THE INVENTION

This invention relates to an in-line, dual drive mechanism for selectively driving, in the preferred embodiment, a refrigerant compressor by either an electric motor or alternately by an internal combustion engine. Bearing means are provided to journal the rotor of the electric motor for relative rotation on the output shaft of the internal combustion engine. A centrifugal clutch is connected to the engine flywheel output shaft for rotation therewith and to drive the rotor assembly when the rotational speed of the flywheel output shaft exceeds a predetermined minimum.

A clutch drum sleeve is included in the rotor assembly to connect the clutch to the rotor, while a spider drive sleeve connects the motor rotor to the compressor, so as to cause the compressor shaft to rotate as the rotor is rotated, either in response to the energization of the motor or in response to the rotation of the engine output shaft above the predetermined minimum speed. Both the spider drive sleeve and the clutch drum sleeve are provided with bearing races to permit the sleeves with the motor rotor assembly to be journalled upon the engine shaft for relative rotation therewith.

A portion of the frame of the compressor, a portion of the frame of the electric motor, and a portion of the engine crankcase wall serves to form an enclosure about the dual drive mechanism and provides the required alignment of the parts. The motor stator and rotor are, in accordance with the instant invention, supported within the dual drive mechanism enclosure to thereby eliminate the conventional motor frame or housing.

DESCRIPTION OF PREFERRED EMBODIMENT

Figure 1:
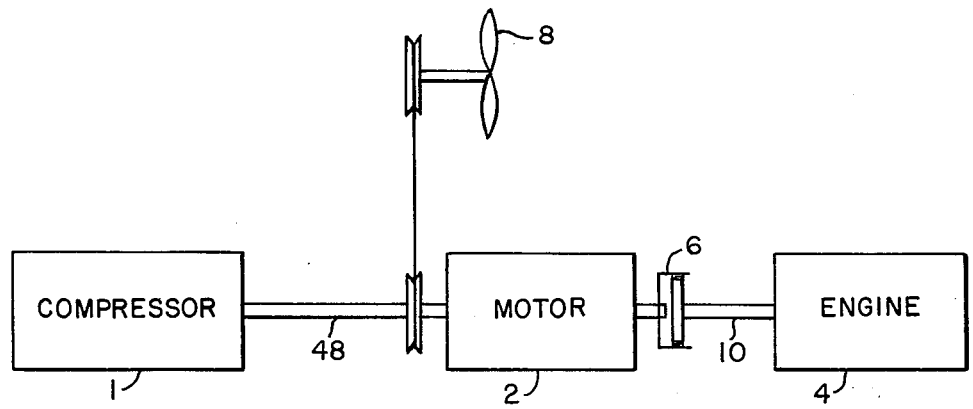
FIG. 1 is a block diagram of the apparatus comprising the dual drive assembly of the instant invention.

Referring to FIG. 1 of the drawings, a block diagram is shown of the apparatus comprising the in-line dual drive assembly of the instant invention. A driven member, such as a refrigerant compressor 1 which may be employed within a transportable refrigeration unit for truck transport refrigeration, may in accordance with the instant invention be selectively driven either by a first electric motor prime mover 2 or alternatively by a second prime mover. The second prime mover in the preferred embodiment is a self-contained internal combustion engine 4, but any other suitable source of mechanical power may be employed. The engine 4 can be automatically connected to the compressor shaft 48 through the rotor assembly of the electric motor 2 (described in greater detail in FIG. 2) by means of a speed responsive clutch, which may be a well known centrifugal clutch or the like. As illustrated in the instant embodiment, the electric motor 2 is to be located in the alignment with common drive line 10 between the compressor 1 and the engine 4, the overall advantages of which will become apparent hereinafter. When it becomes desirable to power a load, such as a belt driven fan 8, for example, and to drive the compressor 1 from the electric motor 2, such as where a refrigerated container were to remain stationary for extended periods of time and where an external electric power source is available, it will be possible to cease engine operation as the engine drops below the predetermined idle speed sufficient to automatically disengage the centrifugal clutch 6.

Figure 2:
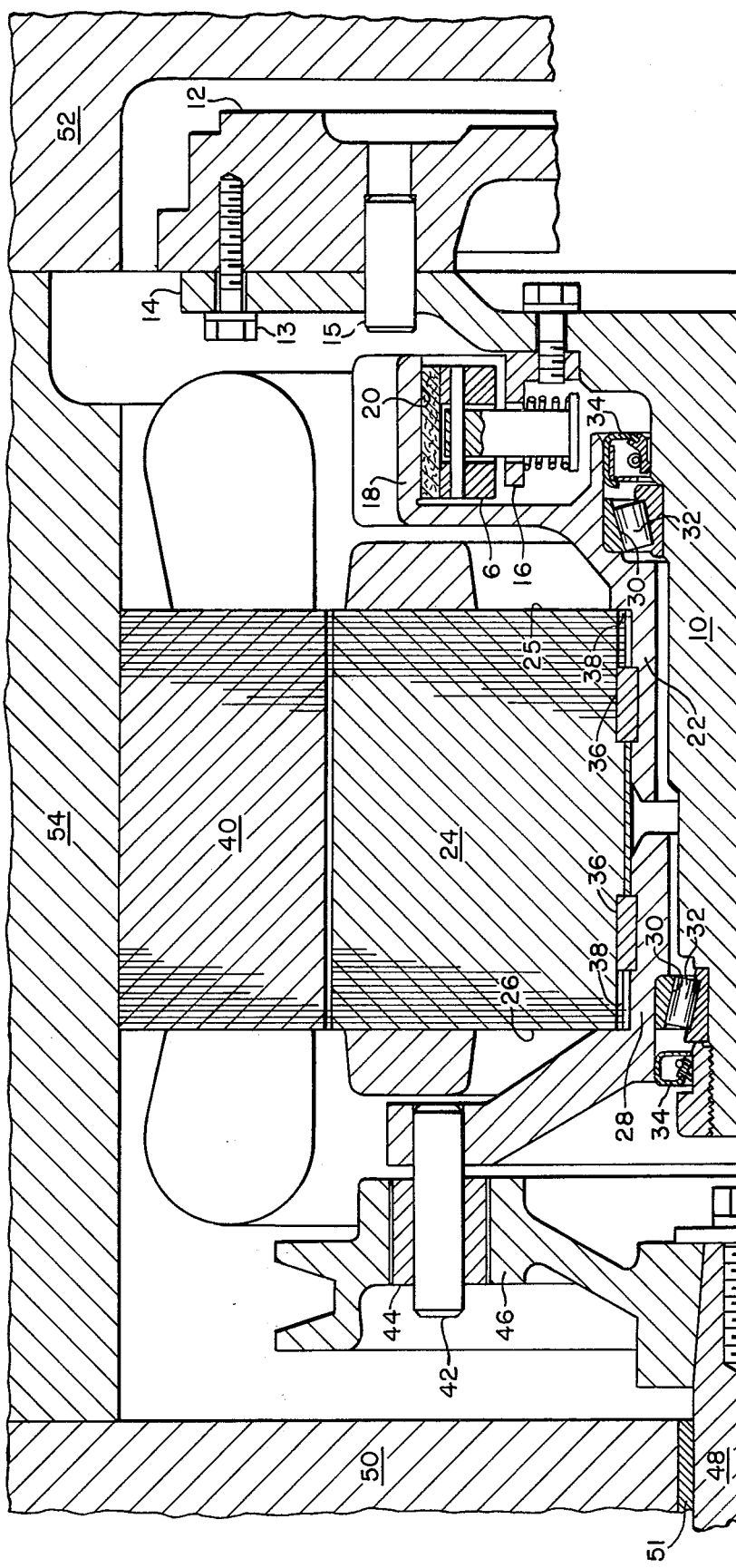
FIG. 2 is a fragmentary front elevation, partially in section, of the integral in-line motor-clutch assembly with the clutch being engaged for engine operation.

FIG. 2 is a partial sectional assembly to illustrate the components of the dual drive mechanism of the instant invention. With the clutch 6 engaged for engine drive, power is taken from the flywheel 12, by means of a carrier arm 14 of the engine output shaft 10. Carrier arm 14 may be secured to flywheel 12 by a pin 15 and a suitable bolt means 13, as shown. The carrier arm 14 provides support for a plurality of centrifugal clutch arms 16 which act as a retention means for clutch 6. During engine operation, the clutch drum 18 and the clutch 6 will be moved into engagement with each other as shown along line 20. The clutch drum 18 is formed as an extension of clutch drum sleeve 22. Fan blades may be added as an integral part of the clutch drum 18 to provide cooling air circulation.

The electric motor rotor 24, which may be an internally axially bored rotor from end to end, is provided at opposite ends with an input end 25 and an output end 26. The clutch drum sleeve 22 is inserted into the assembly from the input end 25 of rotor 24, and a spider drive sleeve 28 is inserted from the opposite output end 26 of rotor 24. Both the clutch drum sleeve 22 and the spider drive sleeve 28 are provided with bearing races 30 to enable the motor rotor 24 to be journalled upon and rotated relative to the engine output shaft 14 by means of bearings 32. Seals 34 at each end of the rotor 24 prevent bearing contamination from the surrounding environment and retain the bearing lubricant. Key members 36 are fitted through respective slots 38 and into key ways positioned between the rotor 24 and the sleeve members 22 and 28 so as to cause the electric motor rotor 24 and its associated components to rotate as the engine output shaft 10 is rotated. The clutch drum 18 and the centrifugal clutch 6, which can be connected to rotor 24 to form an integral part therewith through the clutch drum sleeve 22, is adapted to drive rotor 24 when the rotational speed of the motor output shaft 10 exceeds a predetermined minimum.

A plurality of coupling drive pins 42 are extended between respective resilient bushings 44, formed in a compressor coupling 46, and spider drive sleeve 28 so as to provide necessary driving torque for the compression shaft 48 from motor rotor 24, to cause the compressor shaft 48 to rotate as the rotor 24 is rotated, either in response to the energization of the electric motor or in response to the rotation of the engine output shaft 10 above the predetermined speed.

An enclosure is formed around the dual drive mechanism of the instant invention to provide the required alignment of the parts. The enclosure consists of a portion of the compressor frame 50 forming one end of the enclosure and separated from the compressor shaft 48 by a bearing element 51, a portion of the engine crankcase wall 52 forming the other end of the enclosure, and a portion of the electric motor frame 54 which may also be termed a flywheel housing and which supports the compressor frame 50 in relation to the engine crankcase wall 52 and serves as a suitable housing for the electric motor stator 40. With the enclosure as that described in the instant invention to support the rotor 24 and stator 40 in alignment upon output shaft 10, the conventional motor frame and housing may be eliminated, thereby achieving a cost and space reduction. Also, by virtue of the parts arrangement in the instant invention and with both power sources adapted to drive the compressor with the motor rotor 24 journalled by bearings 32 on the engine output shaft 10 for relative rotation therewith, the need for the conventional electric motor shaft and bearings is thereby eliminated, and by employing a single speed responsive clutch 6, an economy of parts, a relative ease in manufacture and a more compact arrangement may be established as compared to the prior art dual drive assemblies.

During engine operation, when the motor rotor 24 is connected to the carrier arms 14, the same rotating velocity of the carrier arms 14 and rotor 24 results in no relative motion of bearings 32 and seals 34. During electric motor operation, the clutch 6 is disengaged and the carrier arms 14 and flywheel 12 are motionless, and rotation of the motor rotor 24 due to the electric field action of the motor stator 40 results in rotation of bearings and seals.

Figure 3:
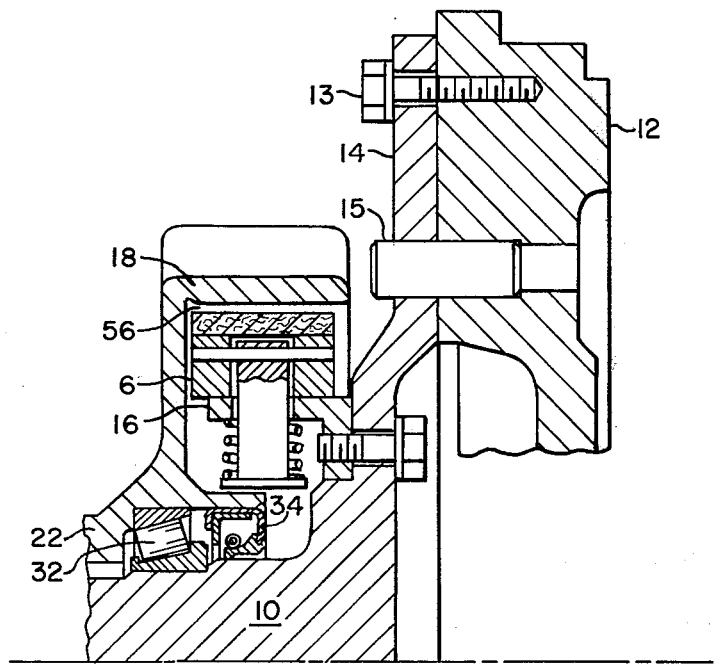
FIG. 3 is a detailed view, partially in section, of the speed responsive clutch of the instant invention when disengaged for electric motor operation.

Referring now to FIG. 3, the centrifugal clutch 6 of FIG. 2 is shown, but now is disengaged from the clutch drum 18 to form a gap or space 56 therebetween, as illustrated, for electric motor operation. As previously disclosed, centrifugal clutch 6 will automatically disengage clutch drum 18 and fall back upon retaining arm 16 when the speed of the engine is reduced below the predetermined level which would otherwise be sufficient to maintain the clutch 6 and drum 18 in engagement with one another, and thereupon, carrier arm 14 and flywheel 12 will subsequently become motionless. In place of the speed responsive centrifugal clutch as described, various other forms of clutches may be used as will be obvious to those skilled in the art.

Although a disclosed application of the dual drive apparatus of the instant invention is to drive a refrigerant compressor load by either an optional motor or engine power source, the apparatus may be suitably adapted for driving other types of rotating loads, including pumps, hoists, generators, and the like. The apparatus would also be suitable for employing various other power sources other than the disclosed internal combustion engine prime mover, such as another electric motor, a pneumatic motor, or a hydraulic motor, all with the same economy of parts and reduction of space as that achieved by the instant embodiment.

I claim:

1. A dual drive mechanism for selectively driving a driven member either by a first electric motor prime mover or alternatively by a second prime mover wherein said first prime mover is disposed between said driven member and second prime mover, said first prime mover having a housing consisting of a stator frame connected to a portion of the frame of the second prime mover and a portion of the frame of the driven member, an output shaft for said second prime mover protruding into said housing, an electric motor rotor assembly having means adapted to be driven by a speed responsive clutch, said rotor assembly journalled for rotation on said protruding portion of said second prime mover output shaft, said speed responsive clutch connected to said second prime mover output shaft and adapted to drive said rotor assembly when the rotational speed of said output shaft exceeds a predetermined minimum, and means to connect said rotor assembly to said driven member to cause said driven member to rotate when said rotor assembly is rotated either in response to the energization of said first electric motor prime mover or in response to the rotation of said second prime mover output shaft above the predetermined minimum speed.

2. The invention of claim 1, wherein said speed responsive clutch is a centrifugal clutch.

3. The invention of claim 1, wherein said second prime mover is an internal combustion engine.

4. The invention of claim 1, wherein the means to connect said motor rotor to said driven member to rotate as said rotor is rotated is a spider drive sleeve.

5. The invention of claim 1, wherein said driven member is a refrigerant compressor.

* * * * *

UNITED STATES PATENT AND TRADEMARK OFFICE
CERTIFICATE OF CORRECTION

PATENT NO. : 3,941,012
DATED : March 2, 1976
INVENTOR(S) : Donald K. Mayer

It is certified that error appears in the above-identified patent and that said Letters Patent are hereby corrected as shown below:

In the front data page, item [73] "Assignee" should read as follows:

Thermo King Corporation
Minneapolis, Minnesota

Signed and Sealed this

Twenty-ninth Day of August 1978

[SEAL]

Attest:

RUTH C. MASON
Attesting Officer

DONALD W. BANNER
Commissioner of Patents and Trademarks